US010612569B2

(12) United States Patent
Dunham et al.

(10) Patent No.: US 10,612,569 B2
(45) Date of Patent: Apr. 7, 2020

(54) ADDITIVELY MANUFACTURED ROTARY ACTUATOR

(71) Applicant: General Electric Company, Schenectady, NY (US)

(72) Inventors: Earl Neal Dunham, Hamilton, OH (US); Aigbedion Akwara, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 15/706,867

(22) Filed: Sep. 18, 2017

(65) Prior Publication Data
US 2019/0085874 A1    Mar. 21, 2019

(51) Int. Cl.
| | | |
|---|---|---|
| *F15B 15/20* | (2006.01) | |
| *B29C 64/205* | (2017.01) | |
| *F15B 7/06* | (2006.01) | |
| *B33Y 80/00* | (2015.01) | |
| *B33Y 10/00* | (2015.01) | |
| *B29C 64/40* | (2017.01) | |
| *B29C 64/165* | (2017.01) | |
| *B33Y 50/02* | (2015.01) | |
| *F16H 61/32* | (2006.01) | |
| *B29C 64/135* | (2017.01) | |

(52) U.S. Cl.
CPC .......... *F15B 15/202* (2013.01); *B29C 64/205* (2017.08); *F15B 7/06* (2013.01); *B29C 64/135* (2017.08); *B29C 64/165* (2017.08); *B29C 64/40* (2017.08); *B33Y 10/00* (2014.12); *B33Y 50/02* (2014.12); *B33Y 80/00* (2014.12); *F16H 2061/326* (2013.01)

(58) Field of Classification Search
CPC ....................................... F15B 15/12
See application file for complete search history.

(56) References Cited

U.S. PATENT DOCUMENTS

| | | | | |
|---|---|---|---|---|
| 287,218 | A * | 10/1883 | Baughman | F15B 15/12 251/59 |
| 840,796 | A * | 1/1907 | Oakman | F15B 15/12 239/581.1 |
| 3,554,096 | A * | 1/1971 | DeJager | F15B 15/12 92/125 |

(Continued)

FOREIGN PATENT DOCUMENTS

WO    WO2016/133497 A1    8/2016

*Primary Examiner* — Thomas E Lazo
*Assistant Examiner* — Matthew Wiblin
(74) *Attorney, Agent, or Firm* — Dority & Manning, P.A.

(57) ABSTRACT

A rotary actuator and a method of additively manufacturing the same are provided. The rotary actuator includes a valve housing defining a valve chamber and a shaft channel extending from the valve chamber. A valve body includes a valve shaft extending through the shaft channel and a valve head positioned within the valve chamber and defining a head width that is larger than the channel diameter to inseparably join the valve body and the valve housing. The valve head divides the valve chamber into a first chamber and a second chamber which are in fluid communication with a first port and a second port, respectively. The valve body is rotated by adjusting a fluid pressure within at least one of the first chamber and the second chamber.

19 Claims, 5 Drawing Sheets

(56) References Cited

U.S. PATENT DOCUMENTS

| | | | |
|---|---|---|---|
| 5,948,342 A * | 9/1999 | Nakazawa | B29C 64/153 |
| | | | 264/400 |
| 7,674,361 B2 | 3/2010 | Cohen | |
| 9,500,230 B2 | 11/2016 | Hiller et al. | |
| 9,562,616 B2 | 2/2017 | Strom et al. | |
| 2015/0274280 A1 * | 10/2015 | Sheahan, Jr. | B64C 9/02 |
| | | | 244/99.5 |
| 2016/0238251 A1 | 8/2016 | Chang | |
| 2017/0023061 A1 | 1/2017 | Sanz | |
| 2017/0028640 A1 | 2/2017 | Harrison et al. | |
| 2017/0072634 A1 | 3/2017 | Reznar | |
| 2017/0096847 A1 | 4/2017 | Liu et al. | |
| 2018/0281940 A1 * | 10/2018 | Collins | B64C 27/64 |

\* cited by examiner

ADDITIVELY MANUFACTURED ROTARY ACTUATOR

FIELD

The present subject matter relates generally to a rotary actuator, or more particularly to an additively manufactured rotary actuator.

BACKGROUND

Actuators are commonly used in a variety of industries for moving or controlling a mechanism of a system to achieve some result. Actuators may be activated hydraulically, pneumatically, mechanically, electrically, magnetically, or in any other suitable manner. For example, actuators are commonly used to initiate some control action or mechanical movement, such as to control hydraulic valves to regulate the flow of fluid within a hydraulic system.

A common type of actuator is a rotary actuator, which is an actuator that produces a rotary motion or torque in response to a control signal. Certain rotary actuators may be operably coupled to rotary valves for rotating the valve between two or more position to regulate fluid flow. However, conventional actuators include multiple components that must be assembled together. Such actuators are more expensive due to the increased number of components needed and the assembly time required. In addition, each joint, fastening point, or other mating surface introduces a new potential leak point. Therefore, certain conventional actuators cost more, are less reliable, and generally exhibit poor performance.

Accordingly, an improved actuator, such as a rotary actuator, would be useful. More specifically, a rotary actuator that is reliable and easy to manufacture would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured rotary actuator including a valve housing defining a substantially enclosed valve chamber and a shaft channel extending from the valve chamber, the shaft channel defining a channel diameter. A valve body includes a valve shaft extending through the shaft channel and a valve head positioned within the valve chamber. The valve head divides the valve chamber into a first chamber and a second chamber and the valve head defines a head width that is larger than the channel diameter. The valve body is rotatable about an axis of rotation within the valve housing between a first position and a second position.

In another exemplary embodiment of the present disclosure, a method for manufacturing a rotary actuator includes depositing a layer of additive material on a bed of an additive manufacturing machine and selectively directing energy from an energy source onto the layer of additive material to fuse a portion of the additive material and form the rotary actuator. The rotary actuator includes a valve housing defining a valve chamber and a shaft channel extending from the valve chamber, the shaft channel defining a channel diameter. A valve body includes a valve shaft extending through the shaft channel and a valve head positioned within the valve chamber, wherein the valve head defines a head width that is larger than the channel diameter to inseparably join the valve body and the valve housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
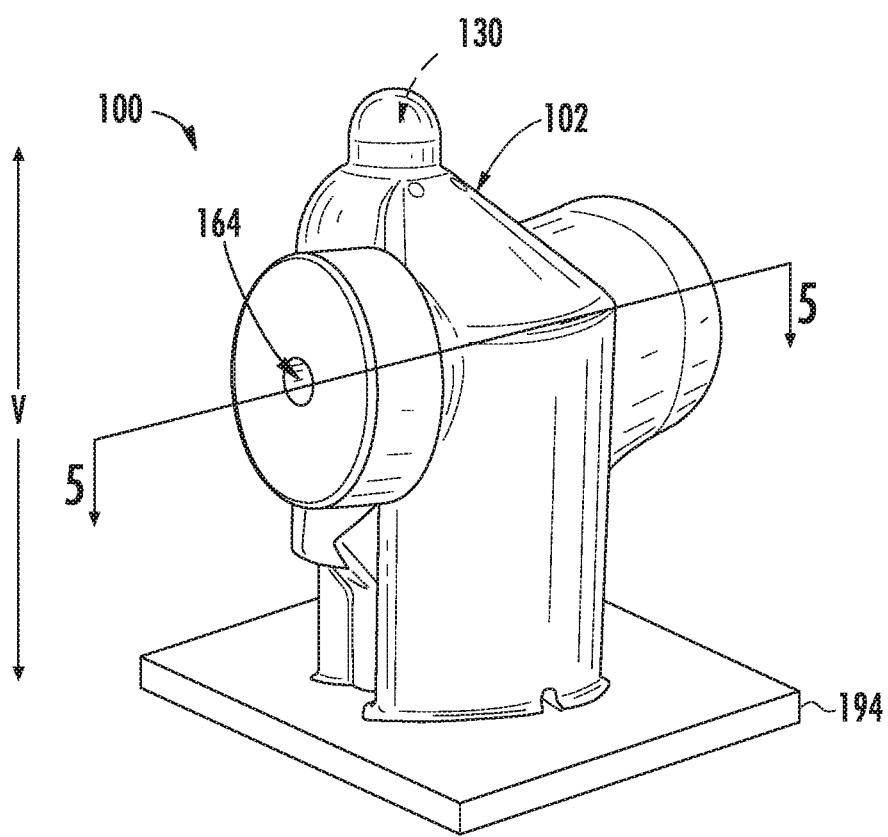
FIG. 1 is a perspective view of a rotary actuator according to an exemplary embodiment of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent margin of error.

The present disclosure is generally directed to a rotary actuator and a method of additively manufacturing the same. The rotary actuator includes a valve housing defining a valve chamber and a shaft channel extending from the valve chamber. A valve body includes a valve shaft extending through the shaft channel and a valve head positioned within the valve chamber and defining a head width that is larger than the channel diameter to inseparably join the valve body and the valve housing. The valve head divides the valve chamber into a first chamber and a second chamber which are in fluid communication with a first port and a second port, respectively. The valve body is rotated by adjusting a fluid pressure within at least one of the first chamber and the second chamber.

Referring now generally to FIGS. 1 through 5, a rotary actuator 100 is provided in accordance with an exemplary embodiment of the present disclosure. Although the construction and method of making rotary actuator 100 are described generally herein, it should be appreciated that rotary actuator 100 can be configured for use in any suitable application and in any suitable industry. For example, the concepts described herein could be used in automotive, aviation, maritime, and other industries to assist in an actuation process. Moreover, FIG. 1 illustrates an exemplary embodiment of rotary actuator 100 for the purpose of explaining its general operation, but the size, shape, and configuration of rotary actuator 100 is not intended to limit the scope of the present subject matter.

In general, the exemplary embodiments of rotary actuator 100 described herein may be manufactured or formed using any suitable process. However, in accordance with several aspects of the present subject matter, some or all of rotary actuator 100 may be formed using an additive-manufacturing process, such as a 3-D printing process. The use of such a process may allow rotary actuator 100 to be formed integrally, as a single monolithic component, or as any suitable number of sub-components. In particular, the manufacturing process may allow rotary actuator 100 to be integrally formed and include a variety of features not possible when using prior manufacturing methods. For example, the additive manufacturing methods described herein enable the manufacture of actuators having unique features, configurations, thicknesses, materials, densities, and structures not possible using prior manufacturing methods. Some of these novel features can, for example, permit relative motion between two components of rotary actuator 100 after simultaneous formation of such components using an additive manufacturing process as described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and features that allow for relative motion between sub-components. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Referring now generally to FIGS. 1 through 5, various views of a rotary actuator 100 in accordance with an exemplary embodiment of the present disclosure are provided. Notably, FIGS. 1 through 5 illustrate only portions of rotary actuator 100 for the purpose of explaining aspects of the present subject matter, while other components are removed for clarity. In addition, rotary actuator 100 is only one exemplary actuator and other types and configurations of actuators may be used according to alternative embodiments. The particular exemplary embodiment described is not intended to limit the subject matter of the present disclosure in any manner.

Figure 2:
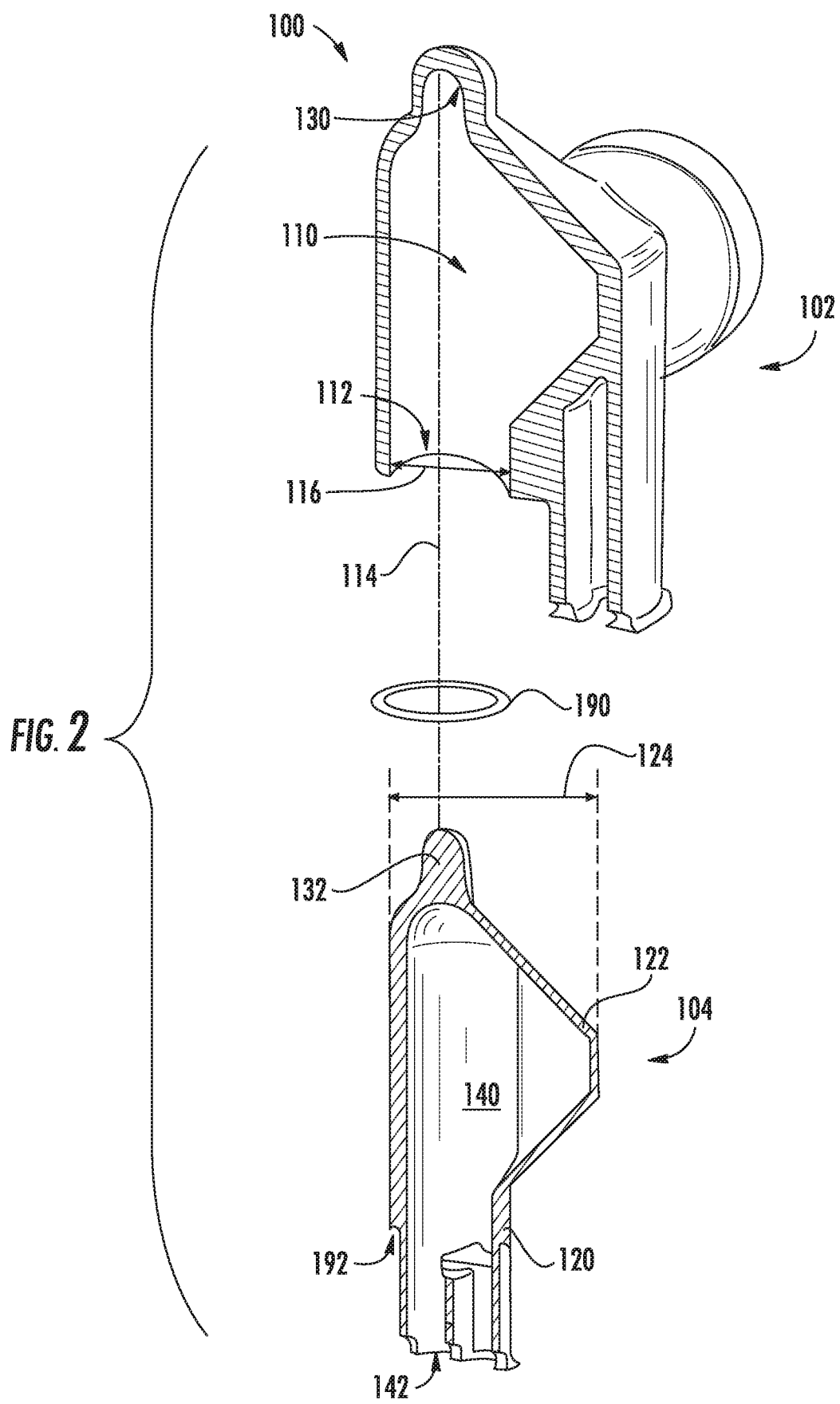
FIG. 2 is an exploded cross sectional view of the exemplary rotary actuator of FIG. 1.
Figure 3:
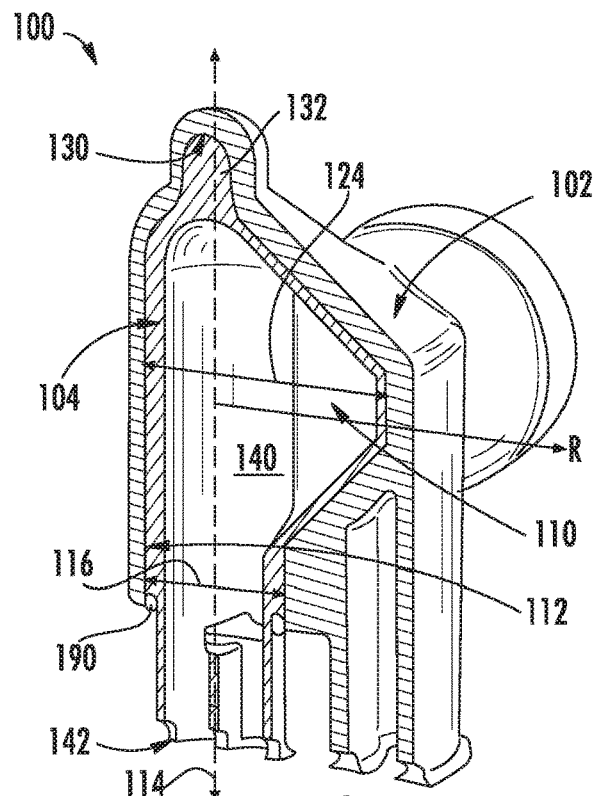
FIG. 3 is an assembled cross-sectional view of the exemplary rotary actuator of FIG. 1.

As best shown in FIGS. 2 and 3, rotary actuator 100 generally includes a valve housing 102 and a valve body 104 rotatably positioned and coupled to valve housing 102. More specifically, valve housing 102 defines a valve chamber 110 and a shaft channel 112 extending from valve chamber 110. Shaft channel 112 generally defines a central axis 114. In addition shaft channel 112 defines a channel diameter 116. As illustrated, the widest portion of valve chamber 110 is wider than channel diameter 116. Furthermore, valve chamber 110 is substantially enclosed, e.g., it opens up only to shaft channel 112.

Valve body 104 includes a valve shaft 120 and a valve head 122 positioned on the valve shaft 120. As mentioned above, valve body 104 is positioned within and rotates relative to valve housing 102. More particularly, valve shaft 120 is positioned within and extends through shaft channel 112 and valve head 122 is positioned within valve chamber 110. In this regard, for example, valve shaft 120 may have a shaft diameter that is substantially equivalent to channel diameter 116. In this manner, because valve chamber 110 is substantially enclosed by valve housing 102, valve head 122 may not be removed from valve chamber 110. Although shaft channel 112 and valve shaft 120 are illustrated herein as being substantially cylindrical, e.g., to facilitate a rotary action, it should be appreciated that other suitable sizes, shapes, and configurations may be used for these components while remaining within the scope of the present subject matter.

As illustrated, valve head 122 defines a head width 124 that is larger than channel diameter 116. In this manner, after valve body 104 is manufactured within valve housing 102, valve head 122 is retained within valve chamber 110 and is prevented from being pulled out of valve chamber 110 through shaft channel 112. Therefore, valve body 104 is inseparably joined to valve housing 102, but may still rotate about the central axis 114, as described in more detail below.

According to the illustrated embodiment, rotary actuator 100 is illustrated as having a shaft channel 112 that extends away from valve chamber 110 and defines a restriction relative to valve chamber 110 which prevents valve head 122 from being removed. However, it should be appreciated that according to alternative embodiments, any suitable restriction or narrowing of valve chamber 110 or another dedicated flange, lip, or other retention member may be used to retain valve head 122 and thus valve body 104 within valve housing 102.

For example, according to the illustrated embodiment, valve head 122 generally includes a radial flag extending from one side of valve shaft 120 substantially along a radial direction R defined perpendicular to central axis 114. Notably, valve chamber 110 may define a complementary shape to valve head 122 such that valve head 122 fits relatively tightly within valve chamber 110. For example, according to the illustrated embodiment, the radial flag and valve chamber 110 define a substantially triangular cross section.

Valve housing 102 and or valve body 104 may also define various features for facilitating their rotational engagement. For example, according to the illustrated embodiment, valve housing 102 defines an alignment recess 130 centered along the central axis 114 and valve body 104 defines an alignment knob 132 configured for receipt in alignment recess 130. In this manner, alignment knob 132 and alignment recess 130 act substantially like a hinge and ensure smooth rotational motion between valve body 104 and valve housing 104. Notably, although illustrated as a protruding knob on valve body 104 and a complementary recess on valve housing 102, it should be appreciated that any suitable complementary alignment features may be used according to alternative embodiments.

As shown in FIGS. 2 through 5, valve body 104 generally defines a hollow interior 140. Notably, forming valve body 104 with hollow interior 140 decreases the weight of rotary actuator 100 and by lowers the torque required to rotate valve body 104, e.g., due to a lower mass. In addition, valve shaft 120 may be keyed to engage an actuated component. More specifically, as illustrate in FIG. 4, a bottom 142 of valve shaft 120 defines a keyed feature 144 for engaging a spindle of a fluid valve.

Figure 4:
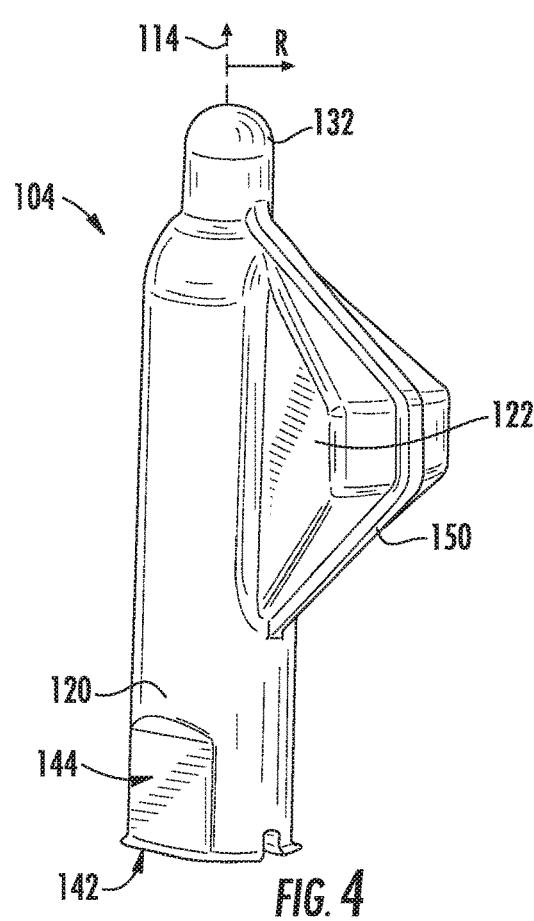
FIG. 4 is a perspective view of a valve body of the exemplary rotary actuator of FIG. 1 according to an exemplary embodiment of the present subject matter.

Still referring to FIG. 4, valve body 104, or more specifically valve head 122 may further define one or more wiper blades 150 extending from valve head 122 toward valve housing 102. Wiper blade 150 is generally a protruding rib or ridge defined on valve head 122 to create a tighter fit with valve chamber 110. In this regard, a wiper gap 152 is defined between wiper blades 150 and valve housing 102. Wiper gap 152 may be any size suitable for achieving the desired engagement between valve head 122 and valve chamber 110 for a given application. Wiper gap 152 is also defined to ensure that valve head 122 does not fuse to valve housing 102 during the additive manufacturing process and that valve body 104 may rotate relative to valve housing 102 after manufacturing. For example, according to one embodiment, wiper gap 152 is between about 0.05 millimeters and 0.5 millimeters. According to another embodiment, wiper gap 152 is between about 0.1 millimeters and 0.15 millimeters.

Figure 5:
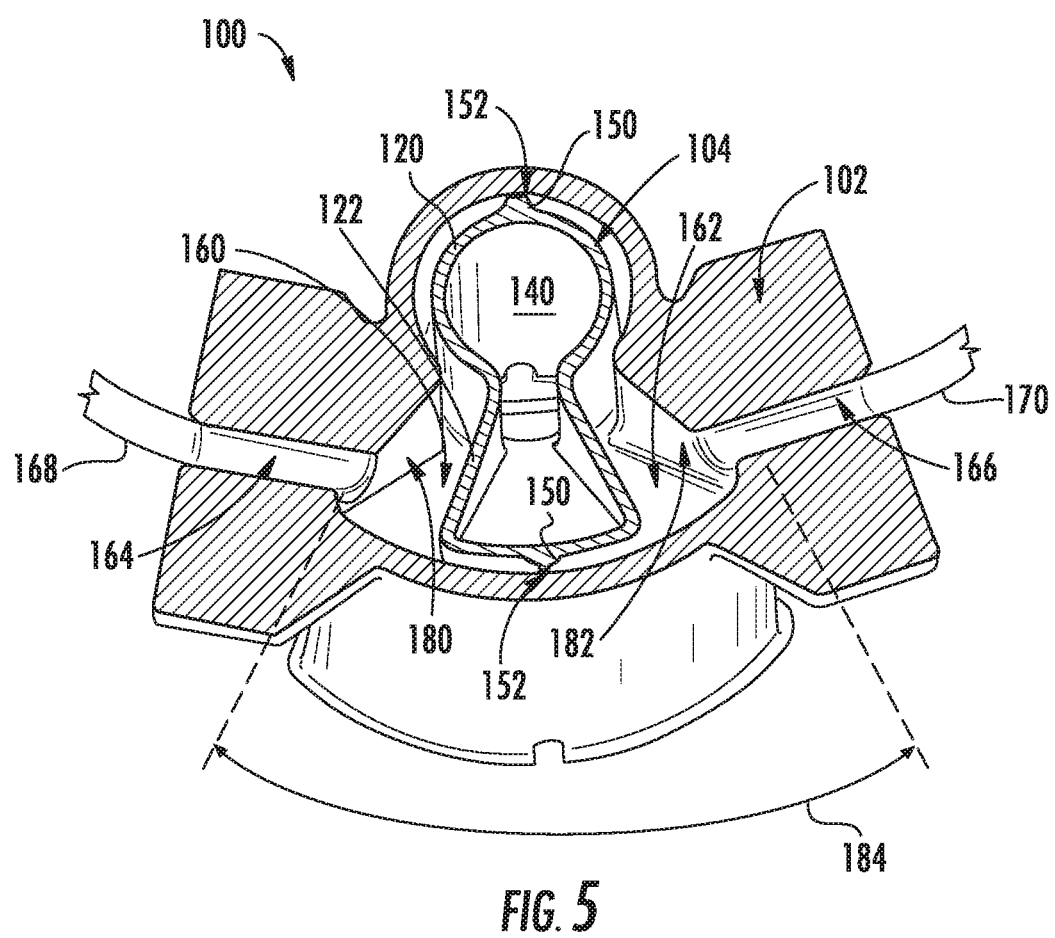
FIG. 5 is another cross-sectional view of the exemplary rotary actuator of FIG. 1, taken along Line 5-5 of FIG. 1.

As best illustrated in FIG. 5, valve head 122 divides valve chamber 110 into a first chamber 160 and a second chamber 162. In addition, valve housing 102 defines a first port 164 in fluid communication with first chamber 160 and a second port 166 in fluid communication with second chamber 162. A first conduit 168 may be coupled to first port 164 and a second conduit 170 may be coupled to second port 166. Notably, the pressure of fluid within first chamber 160 and second chamber 162 may be used to rotate valve body 104 about central axis 114 between a first position and a second position. More specifically, by adjusting the fluid pressure in first chamber 160 and second chamber 162, e.g., using conduits 168, 170, the relative pressure difference between first chamber 160 and second chamber 162 acts to rotate valve body 104.

The angle of rotation of valve body 104 may be controlled by adjusting the shape of valve chamber 110 or by positioning stops or some other stopping mechanism within valve chamber 110 or on valve shaft 120. According to the illustrated embodiment, valve chamber 110 defines a triangular cross section that sweeps through an arc of approximately 90 degrees. More specifically, as best illustrated in FIG. 5, first chamber 160 is defined in part by a first wall 180 of valve housing 102 and second chamber is defined in part by a second wall 182 of valve housing 102. According to the illustrated embodiment, first wall 180 and second wall 182 are separated by an angle 184 of about 90 degrees. However, it should be appreciated that any other suitable angle 184 may be chosen to regulate the rotational motion of valve body 104. The first position of valve body 104 may correspond to valve head 122 engaging first wall 180 and the second position of valve body 104 may correspond to valve head 122 engaging second wall 182.

Referring now specifically to FIGS. 2 and 3, rotary actuator 100 may include one or more seals for making the interface between valve body 104 and valve housing 102 fluid tight. In this regard, for example, rotary actuator 100 may include an annular seal 190 positioned between valve body 104 and valve housing 102. More specifically, according to the illustrated embodiment, annular seal 190 is an o-ring positioned in a recess 190 defined proximate bottom 142 of valve shaft 120 or at a bottom of shaft channel 112 adjacent valve housing 102. Alternatively, recess 192 may be defined by valve housing 102 proximate bottom 142 of valve shaft 120 or at a bottom of shaft channel 112. It should be appreciated that this is only one exemplary mechanism for sealing valve chamber 110 such that hydraulic fluid or air cannot leak out and cause operability issues with rotary actuator 100. Other configurations are possible and within the scope of the present subject matter.

Notably, according to the exemplary embodiment described herein, valve body 104 is simultaneously additively manufactured with valve housing 102. For example, as illustrated schematically in FIG. 1, rotary actuator 100 generally defines a vertical direction V parallel to central axis 114. Valve body 104 and valve housing 102 are additively manufactured on a build platform 194 along the vertical direction V. In this regard, valve body 104 and valve housing 102 are thus additively manufactured (e.g., "printed") simultaneously layer-by-layer along the vertical direction V from a first end proximate bottom 142 of valve shaft 120 and a second end proximate valve head 122 or alignment recess 130 using one or more of the additive manufacturing techniques described above.

It should be appreciated that rotary actuator 100 is described herein only for the purpose of explaining aspects of the present subject matter. For example, rotary actuator 100 will be used herein to describe exemplary configurations, constructions, and methods of manufacturing rotary actuator 100. It should be appreciated that the additive manufacturing techniques discussed herein may be used to manufacture other actuators and components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of rotary actuator 100 according to an exemplary embodiment of the present subject matter has been presented, an exemplary method 200 for forming a rotary actuator according to an exemplary embodiment of the present subject matter is provided. Method 200 can be used by a manufacturer to form rotary actuator 100, or any other suitable rotary actuator. It should be appreciated that the exemplary method 200 is discussed herein only to describe exemplary aspects of the present subject matter, and is not intended to be limiting.

Figure 6:
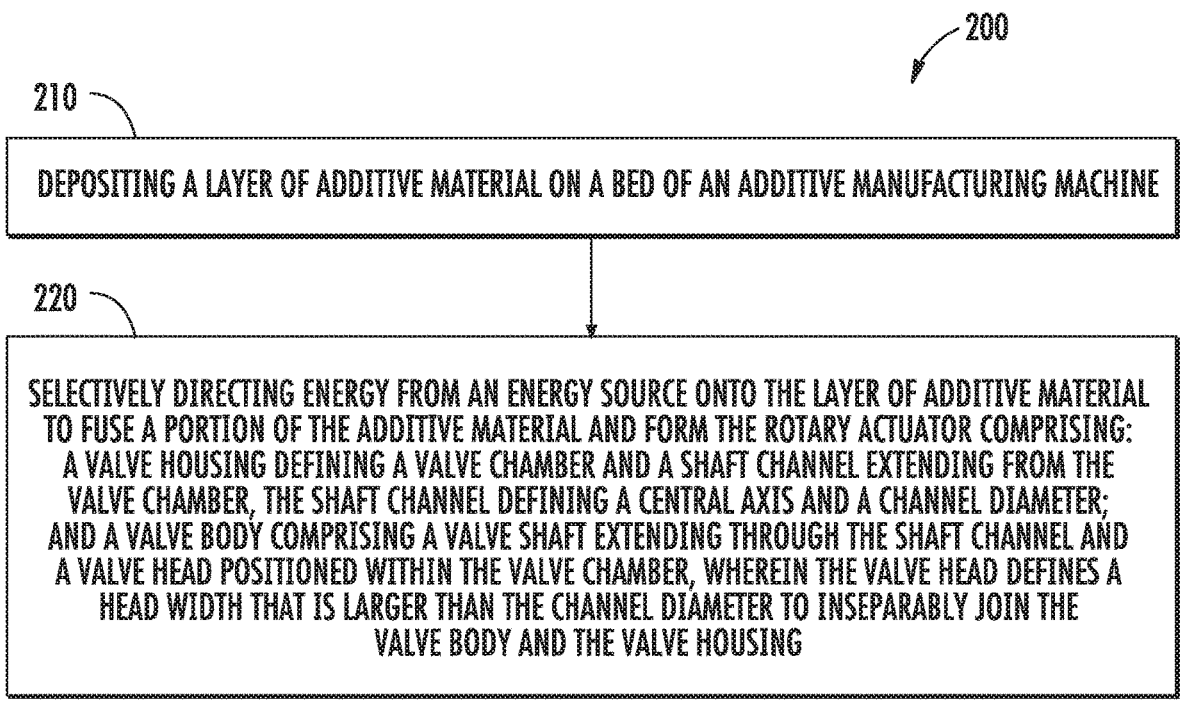
FIG. 6 is a method of manufacturing a rotary actuator according to an exemplary embodiment of the present subject matter.

Referring now to FIG. 6, method 200 includes, at step 210, depositing a layer of additive material on a bed of an additive manufacturing machine. Step 220 includes selectively directing energy from an energy source onto the layer of additive material to fuse a portion of the additive material and form the rotary actuator. The rotary actuator formed may be similar in some or all respects to rotary actuator 100 described above.

For example, using the example from above, the rotary actuator formed at step 210 may include a valve housing defining a valve chamber and a shaft channel extending from the valve chamber. The shaft channel may define a central axis and a channel diameter. The rotary actuator may further include a valve body including a valve shaft extending through the shaft channel and a valve head positioned within the valve chamber. According to one embodiment, the valve head defines a head width that is larger than the channel diameter to inseparably join the valve body and the valve housing. Notably, according to an exemplary embodiment, the valve body and the valve housing are simultaneously additively manufactured as distinct, but inseparable monolithic components.

According to an exemplary embodiment, the valve head divides the valve chamber into a first chamber and a second chamber when positioned therein. In order to actuate the rotary actuator (i.e., to move it between a first, e.g., open, position to a second, e.g., closed, position), method 200 can further include fluidly coupling a first conduit to the first chamber and a second conduit to the second chamber. In this manner, by adjusting the fluid pressure within at least one of the first conduit and the second conduit, the valve body may be selectively rotated. According to alternative embodiments, valve body may be biased (e.g., by a mechanical spring) toward a first (e.g., closed) position and a single fluid conduit may be fluidly coupled to valve chamber to selectively rotate valve body to a second (e.g., open) position. Other configurations and control methods are possible and contemplated as within the scope of the present subject matter.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using rotary actuator 100 as an example, it should be appreciated that these methods may be applied to manufacture any suitable actuator or rotary component.

An additively manufactured rotary actuator and a method for manufacturing that rotary actuator are described above. Notably, the rotary actuator may generally include performance-enhancing features whose practical implementations are facilitated by an additive manufacturing process. For example, using the additive manufacturing methods described herein, the rotary actuator may include a valve body that is inseparably formed within a valve housing but which may rotate relative to valve housing. These features may be introduced during the design of the rotary actuator, such that they may be easily integrated into the rotary actuator during the build process at little or no additional cost. Moreover, the entire rotary actuator, including the valve body, the valve housing, and other features can be formed simultaneously as one or more integral and monolithic components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotary actuator, comprising:
   a valve housing defining a substantially enclosed valve chamber and a shaft channel extending from the valve chamber, the shaft channel defining a channel diameter;
   a valve body comprising a valve shaft extending through the shaft channel and a valve head positioned within the valve chamber, the valve head dividing the valve chamber into a first chamber and a second chamber, and wherein the valve head defines a head width that is larger than the channel diameter, the valve body being rotatable about an axis of rotation within the valve housing between a first position and a second position; and
   one or more wiper blades extending from the valve head toward the valve housing, a wiper gap being defined between the one or more wiper blades and the valve housing.

2. The rotary actuator of claim 1, wherein the axis of rotation is co-linear with a central axis defined by the shaft channel.

3. The rotary actuator of claim 1, wherein the wiper gap is between about 0.1 millimeters and 0.15 millimeters.

4. The rotary actuator of claim 1, wherein the valve head comprises a radial flag extending from one side of the valve shaft along a radial direction perpendicular to the axis of rotation, the radial flag having a complementary shape to the valve chamber.

5. The rotary actuator of claim 4, wherein the radial flag defines a substantially triangular cross section.

6. The rotary actuator of claim 1, wherein the first chamber is defined in part by a first wall of the valve housing and the second chamber is defined in part by a second wall of the valve housing, and wherein the valve head engages the first wall in the first position and engages the second wall in the second position.

7. The rotary actuator of claim 6, wherein the first wall and the second wall are separated by an angle of about 90 degrees.

8. The rotary actuator of claim 1, further comprising:
   a first port defined by the valve housing and being in fluid communication with the first chamber, a first conduit being fluidly coupled to the first port; and
   a second port defined by the valve housing and being in fluid communication with the second chamber, a second conduit being fluidly coupled to the second port, wherein the rotation of the valve body is controlled by adjusting a fluid pressure within at least one of the first conduit and the second conduit.

9. The rotary actuator of claim 1, wherein the valve housing defines an alignment recess centered along the axis of rotation and the valve body defines an alignment knob configured for receipt in the alignment recess.

10. The rotary actuator of claim 1, wherein a bottom of the valve shaft defines a keyed feature for engaging and actuating a rotating component.

11. The rotary actuator of claim 1, wherein an annular seal is positioned between the valve body and the valve housing.

12. The rotary actuator of claim 11, wherein the annular seal is an o-ring positioned in a recess defined at a bottom of the valve shaft.

13. The rotary actuator of claim 1, wherein the valve housing and the valve body are simultaneously additively manufactured as distinct, but inseparable monolithic components.

14. The rotary actuator of claim 1, wherein the rotary actuator defines a vertical direction parallel to central the axis of rotation, the valve housing and the valve body being additively manufactured on a build platform along the vertical direction from a first end proximate valve shaft and a second end proximate valve head.

15. The rotary actuator of claim 1, wherein the rotary actuator comprises a plurality of layers formed by:
depositing a layer of additive material on a bed of an additive manufacturing machine; and
selectively directing energy from an energy source onto the layer of additive material to fuse a portion of the additive material.

16. A method for manufacturing a rotary actuator, the method comprising:
depositing a layer of additive material on a bed of an additive manufacturing machine; and
selectively directing energy from an energy source onto the layer of additive material to fuse a portion of the additive material and form the rotary actuator comprising:
a valve housing defining a valve chamber and a shaft channel extending from the valve chamber, the shaft channel defining a channel diameter;
a valve body comprising a valve shaft extending through the shaft channel and a valve head positioned within the valve chamber, wherein the valve head defines a head width that is larger than the channel diameter to inseparably join the valve body and the valve housing; and
one or more wiper blades extending from the valve head toward the valve housing, a wiper gap being defined between the one or more wiper blades and the valve housing.

17. The method of claim 16, wherein the valve head divides the valve chamber into a first chamber and a second chamber, the method further comprising:
fluidly coupling a first conduit to the first chamber;
fluidly coupling the second conduit to the second chamber; and
selectively rotating the valve body by adjusting a fluid pressure within at least one of the first conduit and the second conduit.

18. The method of claim 16, further comprising:
positioning an annular seal between the valve body and the valve housing in a recess defined at a bottom of the valve shaft.

19. The method of claim 16, wherein the valve housing and the valve body are simultaneously additively manufactured as distinct, but inseparable monolithic components.

* * * * *